United States Patent [19]

Burnand

[11] Patent Number: 4,793,828

[45] Date of Patent: * Dec. 27, 1988

[54] ABRASIVE PRODUCTS

[75] Inventor: Richard P. Burnand, Johannesburg, South Africa

[73] Assignee: Tenon Limited, Tortola, British Virgin Isls.

[*] Notice: The portion of the term of this patent subsequent to Aug. 13, 2002 has been disclaimed.

[21] Appl. No.: 938,365

[22] Filed: Dec. 4, 1986

Related U.S. Application Data

[63] Continuation of Ser. No. 712,421, Mar. 25, 1985, abandoned.

[30] Foreign Application Priority Data

Mar. 30, 1984 [ZA] South Africa ............ 84/2407

[51] Int. Cl.$^4$ ............................................. B24D 3/00
[52] U.S. Cl. ......................................... 51/293; 51/307; 51/308
[58] Field of Search .................... 51/293, 307, 308

[56] References Cited

U.S. PATENT DOCUMENTS

| 3,239,321 | 3/1966 | Blainey et al. | 51/309 |
|---|---|---|---|
| 3,574,580 | 4/1971 | Stromberg et al. | 51/307 |
| 3,912,500 | 10/1975 | Vereschagin et al. | 51/309 |
| 3,944,398 | 3/1976 | Bell | 51/307 |
| 3,982,911 | 9/1976 | Lee | 51/307 |
| 3,999,962 | 12/1976 | Drui et al. | 51/307 |
| 4,124,401 | 11/1978 | Lee et al. | 51/307 |
| 4,151,686 | 5/1979 | Lee et al. | 51/307 |
| 4,224,380 | 9/1980 | Bovenkerk et al. | 51/309 |
| 4,231,195 | 11/1980 | DeVries et al. | 51/307 |
| 4,534,773 | 8/1985 | Phaal et al. | 51/293 |

FOREIGN PATENT DOCUMENTS 997352 7/1965 United Kingdom .

OTHER PUBLICATIONS

Bullen, G. J., "The Effect of Temperature and Matrix on the Strength of Synthetic Diamond".

*Primary Examiner*—Paul Liebermam
*Assistant Examiner*—Willie J. Thompson
*Attorney, Agent, or Firm*—Curtis, Morris & Safford

[57] ABSTRACT

An abrasive tool having a working portion which includes an abrasive insert which is exposed to high temperatures during manufacture or use of the tool. Examples of such tools are dressing or turning tools and surface set or impregnated drill bits. The tools are characterized by the abrasive insert comprising a mass of diamond particles present in an amount of 80 to 90 percent by volume of the insert and a second phase present in an amount of 10 to 20 percent by volume of the insert, the mass of diamond particles containing substantial diamond-to-diamond bonding to form a coherent skeletal mass and a second phase consisting essentially of silicon, the silicon being in the form of silicon and/or silicon carbide. these abrasive inserts have been found to have substantial strength due, at least in part, to the diamond-to-diamond bonding and to be capable of withstanding temperatures of 1200° C. under a vacuum $10^{-4}$ Torr or better or insert or reducing atmosphere without significant graphitization of the diamond occurring.

34 Claims, 2 Drawing Sheets

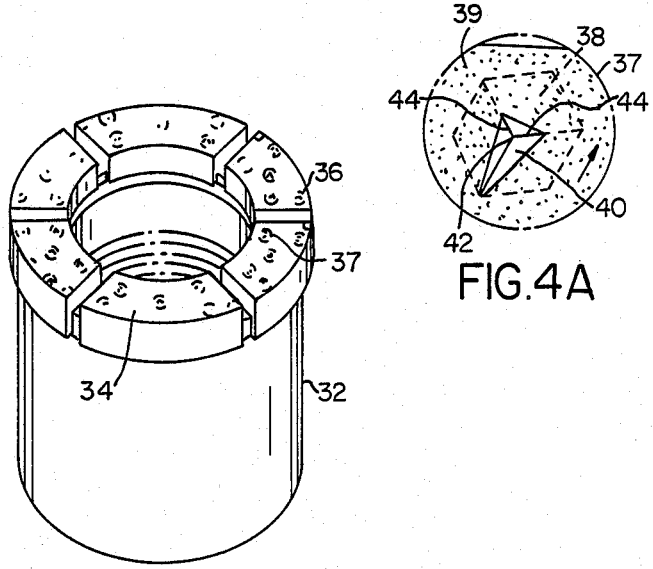
FIG.4
FIG.4A
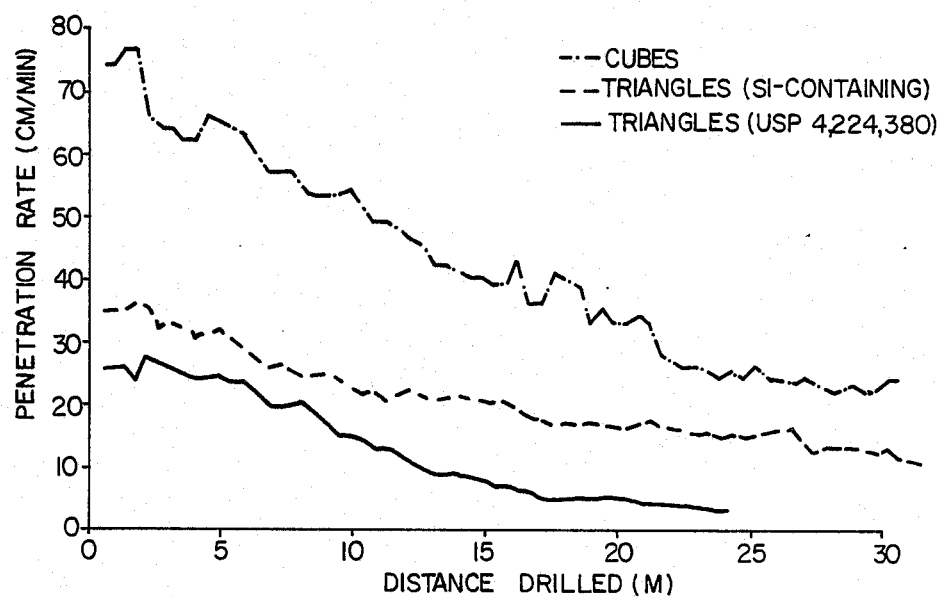
FIG.5

ABRASIVE PRODUCTS

This application is a continuation of application Ser. No. 712,421, filed Mar. 25, 1985, abandoned.

BACKGROUND OF THE INVENTION

This invention relates to abrasive products.

Abrasive compacts are well known in the art and are used extensively in industry for the abrading of various workpieces. They consist essentially of a mass of abrasive particles present in an amount of at least 70 percent, preferably 80 to 90 percent, by volume of the compact bonded into a hard conglomerate. Compacts are polycrystalline masses and can replace single large crystals in many applications. The abrasive particles of compacts are invariably ultra-hard abrasives such as diamond and cubic boron nitride.

Abrasive compacts generally contain a second phase or bonding matrix which contains a catalyst (also known as a solvent) useful in synthesising the particles. In the case of cubic boron nitride, examples of suitable catalysts are aluminium or an alloy of aluminium with nickel, cobalt, iron, manganese or chromium. In the case of diamond, examples of suitable catalysts are metals of Group VIII of the Periodic Table such as cobalt, nickel or iron or an alloy containing such a metal.

As is known in the art, diamond and cubic boron nitride compacts are manufactured under conditions of temperature and pressure at which the abrasive particle is crystallographically stable.

Abrasive compacts may be bonded directly to a tool or shank for use. Alternatively, they may be bonded to a backing such as a cemented carbide backing prior to being mounted on a tool or shank. Such backed compacts are also known in the art as composite abrasive compacts.

U.S. Pat. No. 4,224,380 describes a method of leaching out a substantial quantity of the catalyst from a diamond compact. The product so produced comprises self-bonded diamond particles comprising between about 70 percent and 95 percent by volume of the product, a metallic phase infiltrated substantially uniformly throughout the product, the phase comprising between about 0.05 percent and 3 percent by volume of the product, and a network of interconnected, empty pores dispersed throughout the product and defined by the particles and the metallic phase, the pores comprising between 5 percent and 30 percent by volume of the product. Leaching may be achieved by placing a diamond compact in a hot concentrated nitric-hydrofluoric acid solution for a period of time. This treatment with the hot acid leaches out the catalyst phase leaving behind a skeletal diamond structure. The leached product is said to be thermally more stable than the unleached product.

U.S. Pat. No. 4,124,401 describes and claims a polycrystalline diamond body comprised of a mass of diamond crystals adherently bonded together by a silicon atom-containing bonding medium comprised of silicon carbide and a carbide and/or silicide of a metal component which forms a silicide with silicon, the diamond crystals ranging in size from 1 micron to about 1000 microns, the density of the crystals ranging from at least about 70 percent by volume up to at least about 90 percent by volume of said body, said silicon atom-containing bonding medium being present in an amount ranging up to about 30 percent by volume of said body, said bonding medium being distributed at least substantially uniformly throughout the body, the portion of the bonding medium in contact with the surfaces of the diamond crystals being at least in a major amount silicon carbide and the diamond body being at least substantially pore-free. The metal component for the diamond body is selected from a wide group of metals consisting of cobalt, chromium, iron, hafnium, manganese, molybdenum, niobium, nickel, palladium, platinum, rhenium, rhodium, ruthenium, tantalum, thorium, titanium, uranium, vanadium, tungsten, yttrium, zirconium and alloys thereof. The polycrystalline diamond body is made under relatively mild hot pressing conditions and such that diamond intergrowth will not occur.

U.S. Pat. No. 4,151,686 describes a polycrystalline diamond body similar to that of U.S. Pat. No. 4,124,401 save that the bonding medium is comprised of silicon carbide and elemental silicon and the density of diamond crystals in the body ranges from 80 percent by volume to about 95 percent by volume of the body. Moreover, the polycrystalline abrasive bodies of this United States patent are made under higher applied pressure conditions, i.e. applied pressures of at least about 25 kilobars. The abrasive bodies are said to be useful on an abrasive cutting tool, nozzle or other wear-resistant part.

U.S. Pat. No. 3,234,321 describes diamond compacts having a second phase of titanium, vanadium, zirconium, chromium or silicon or an alloy of any of these metals with nickel, manganese or iron. The compacts are made by mixing the diamond particles with the metal, in powdered form, and subjecting the mixture to elevated conditions of temperature and pressure. One example uses silicon as the metal in an amount of 31.5 volume percent. The patent suggests that the compact may be suitably shaped and mounted for cutting and abrading hard materials.

The complete specification of South African Pat. No. 84/0053 describes an abrasive body which has high strength and an ability to withstand high temperature making it suitable as a tool insert for dressing tools and surface set drill bits. The body comprises a mass of diamond particles present in an amount of 80 to 90 percent by volume of the body and a second phase present in an amount of 10 to 20 percent by volume of the body, the mass of diamond particles containing substantial diamond-to-diamond bonding to form a coherent skeletal mass and the second phase containing nickel and silicon, the nickel being in the form of nickel and/or nickel silicide and the silicon being in the form of silicon, silicon carbide and/or nickel silicide. The abrasive bodies are made under conditions of elevated temperature and pressure suitable for diamond compact manufacture.

SUMMARY OF THE INVENTION

According to the present invention there is provided an abrasive tool having a working portion which includes an abrasive insert held therein, that insert being exposed to a high temperature during manufacture or use of the tool and comprising a mass of diamond particles present in an amount of 80 to 90 percent by volume of the insert and a second phase present in an amount of 10 to 20 percent by volume of the insert, the mass of diamond particles containing substantial diamond-to-diamond bonding to form a coherent, skeletal mass and the second phase consisting essentially of silicon, the silicon being in the form of silicon and/or silicon carbide. Typically, the abrasive tool will be such that the abrasive insert is exposed to a temperature above 850° during manufacture or use of the tool.

DESCRIPTION OF THE DRAWINGS

FIG. 4 is a perspective view of another embodiment of a surface set drill bit of the invention;

FIG. 4A is a perspective view of one of the cubic cutting elements illustrated in FIG. 4;

FIG. 5 illustrates graphically the results obtained in a comparative test.

DETAILED DESCRIPTION OF THE INVENTION

Figure 1:
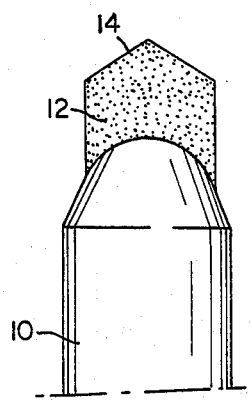
FIG. 1 is a fragmentary side view of a dressing tool of the invention.

As essential feature of the abrasive tool of the invention is that the working portion includes at least one abrasive insert having the characteristics specified above. Such inserts have been found not only to have substantial strength due, at least in part, to the substantial diamond-to-diamond bonding but also to be capable of withstanding a temperature of 1200° C. under a vacuum of $10^{-4}$ Torr or better or an inert or a reducing atmosphere without significant graphitisation of the diamond occurring. The strength of the inserts and their ability to withstand high temperatures makes them ideal as cutting elements or tool inserts for tools where high temperatures are generated during use thereof, as for example in dressing or turning tools, or where high temperatures are required during manufacture of the tool, as for example in surface set or impregnated drill bits.

The silicon second phase in the abrasive insert is uniformly distributed through the coherent, skeletal diamond mass. The second phase, as stated above, consists essentially of silicon, the silicon being in the form of silicon and/or silicon carbide. This means that any other components will be present in the second phase in trace amounts only.

The abrasive inserts used in the invention may take on a variety of shapes depending on the use to which they are put. Examples of suitable shapes are disc, triangular, cube, rectangular and hexagonal. These shapes will generally be cut, for example using laser cutting, from a large abrasive body produced in a manner described fully below. The inserts may also be of irregular shape which may be produced by crushing the large abrasive body.

The abrasive inserts may be provided with a thin metal or alloy coat prior to insertion into the working portion of the tool. The metal coat, for example, may be a chromium or titanium coat which has been found to be particularly suitable for impregnated drill bits.

The inserts used in the abrasive tools of the invention are manufactured using temperatures and pressures in the diamond stable region of the carbon phase diagram. In particular, the inserts are produced from abrasive bodies produced by placing a mass of diamond particles in a reaction vessel, placing a mass of silicon in contact with the mass of diamond particles, placing the loaded reaction vessel in the reaction zone of a high temperature/high pressure apparatus, subjecting the contents of the reaction vessel to conditions of elevated temperature and pressure in the diamond stable region of the carbon phase diagram for a time sufficient to produce the body and recovering the body from the reaction zone. The preferred conditions of elevated temperature and pressure are temperatures in the range 1400° to 1600° C. and pressures in the range 50 to 70 kilobars. These elevated conditions of temperature and pressure will be maintained for a time sufficient to produce the body. Typically, these elevated conditions of temperature and pressure are maintained for a period of 5 to 20 minutes. The silicon may be provided in the form of a powder or in the form of a sheet or foil. It should be added that in order to achieve suitable diamond-to-diamond bonding it has been found preferable to infiltrate the silicon into the diamond mass during manufacture of the body. The diamond-to-diamond bonding is primarily physical diamond-to-diamond interlocking and bonding created by plastic deformation of the diamond particles during manufacture of the element.

The reaction vessel in which the diamonds and silicon are placed may be made of molybdenum, tantalum, titanium or like high melting, carbide-forming metal. It is believed that confining the mass of diamond and silicon within such reaction vessel during manufacture contributes to the excellent diamond-to-diamond bonding which is achieved.

The diamond particles used in the manufacture of the abrasive inserts may vary from coarse to fine particles. Generally the particles will be less than 100 microns in size and typically have a size in the range 10 to 75 microns. Preferred size is in the range 15 to 30 microns.

High temperature/high pressure apparatus is well known in the artsee, for example, U.S. Pat. No. 2,941,248.

The abrasive tool may be a dressing or turning tool which comprises a tool shank and an abrasive insert as defined above mounted in one end thereof to present a dressing or turning edge. FIG. 1 illustrates an example of a dressing tool. Referring to this Figure, there is shown a dressing tool comprising a shank 10 having a cutting element 12 mounted in one end thereof. The cutting element presents a dressing edge 14. High temperatures are generated at the dressing edge 14 during use of the tool. However, it has been found that the excellent thermal stability of the cutting element 12 enables the element to withstand these high temperatures.

The abrasive tool may also be a drill bit which comprises a rotatable body having at one end thereof a cutting face, the cutting face including a plurality of abrasive inserts held in a bonding matrix and presenting cutting edges or points for the face. Examples of such drill bits are surface set drill bits and impregnated drill bits.

For drill bits, it is preferred that the abrasive inserts are either triangular in section or of block form. When the abrasive inserts are triangular in section, the bases thereof will be embedded in the bonding matrix and the apices thereof and side edges leading therefrom will provide cutting edges. When the abrasive inserts are in block form, which is preferably a cube, the major portion thereof will be embedded in the bonding matrix and the cutting edges will be provided by projecting portions of pyramidal shape.

Figure 2:
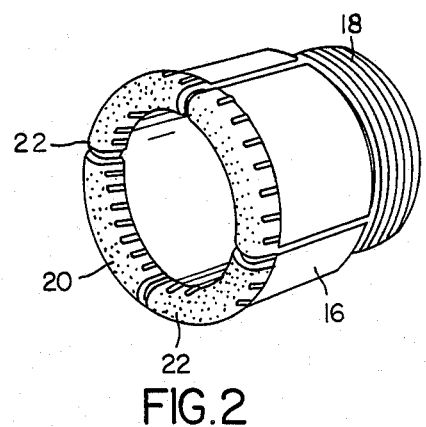
FIG. 2 is a perspective view of a surface set drill bit of the invention.
Figure 3:
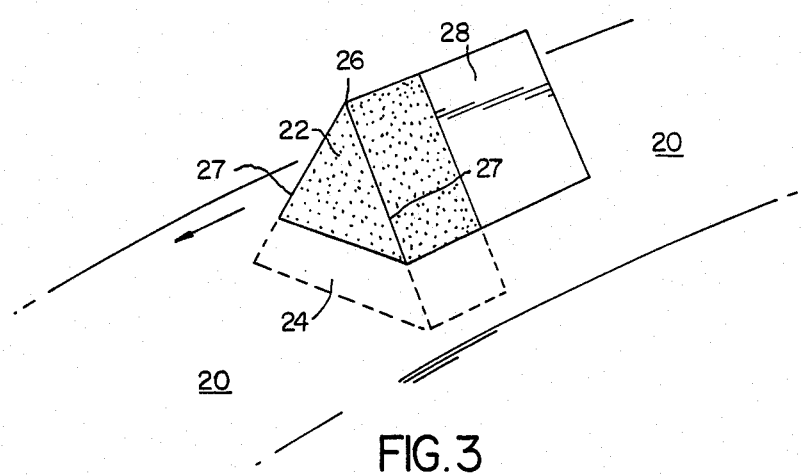
FIG. 3 is a perspective view of a portion of the cutting face of the bit of FIG. 2.

FIGS. 2 and 3 illustrate an embodiment of a surface set drill bit (also known as a coring bit) of the invention. Referring to these Figures, there is shown a surface set drill bit comprising a rotatable core 16 having one end 18 threaded for engagement in a coring drill and a cutting face 20 at the other end thereof. The cutting face 20 comprises a plurality of cutting elements 22 firmly held in a suitable metal matrix. The cutting elements 22 are each triangular in section, as illustrated in greater detail in FIG. 3. The triangular cutting elements 22 are so mounted in the cutting face 20 that the base of the triangle 24 is embedded in the bonding matrix of the face and the apex 26 stands proud of the general plane of the cutting face. It is this apex and side edges 27 which provide the cutting edges. Located immediately behind the triangular abrasive body 22 is a support 30 made of the same metal as that of the cutting face. The direction of rotation of the bit is shown by the arrow.

FIG. 4 illustrates another embodiment of a surface set drill bit of the invention. Referring to this Figure, there is shown a surface set drill bit comprising a rotatable core 32 having at one end thereof a cutting face 34. The cutting face 34 comprises a plurality of cutting elements 36 firmly held in a suitable metal matrix. Each cutting element is of cube form as can be seen from FIG. 4A, which shows the cutting element circumscribed by line 37 in enlarged detail, the major portion 38 of the cutting element embedded in the metal matrix 39. The minor portion 40 of the cube which projects beyond the metal matrix and is of essential pyramidal shape presents a cutting point 42 and cutting edges 44. The direction of rotation of the bit is illustrated by the arrow. As will be demonstrated hereinafter, the cubes, when orientated for corner exposure as illustrated, are more rigidly held within the matrix and, although offering potentially less exposure initially, can withstand more readily the higher point loadings necessary for hard rock fracture than the equivalent pattern setting for triangular elements.

In surface set drill bits, the cutting elements are set into the cutting face using standard high temperature infiltration techniques. The excellent thermal stability of the cutting elements of the invention enables them to withstand such temperatures, which generally exceed 850° C., without significant degradation thereof.

The invention is further illustrated by the following example.

EXAMPLE

A mass of diamond particles (12.5 g) was placed in a tantalum cup. A layer of silicon powder (1.86 g) was placed on top of the mass of diamonds and a tantalum lid placed on the open-end of the cup.

The loaded cup was placed in the reaction zone of a conventional high temperature/high pressure apparatus and subjected to 1500° C. temperature and 55 kilobars pressure and these conditions were maintained for a period of 10 minutes. Recovered from the reaction zone was a disc-shaped abrasive body which comprised a mass of diamond particles in which there was a substantial amount of diamond-to-diamond bonding forming a coherent, skeletal diamond mass and a second phase containing silicon carbide and a small amount of silicon, uniformly distributed through the diamond mass.

The disc-shaped abrasive body was suitably cut by standard laser cutting techniques into a plurality of cubes and triangles. The cubes were mounted in a surface set drill bit of the type illustrated by FIG. 4 and the triangular elements were similarly mounted in a surface set drill bit of the same type. Triangular shaped drill inserts produced following the teachings of U.S. Pat. No. 4,224,380 were also mounted in a surface set drill bit of the type illustrated by FIG. 4. These three drill bits were then used to drill holes in Norite granite and the rate of penetration of each drill bit in relation to the depth drilled was measured at a constantly applied load of 1000 kg. The results illustrated graphically in FIG. 5 show the rate of penetration versus depth drilled in Norite granite. It will be noted that the drill bit containing the cube cutting elements produced a far superior overall drilling rate at the same applied load when compared with the drill bits containing the triangular cutting elements. Furthermore, the overall drilling rate for the drill bit containing silicon-containing triangular cutting elements of the present invention had a superior overall drilling rate when compared with the drill bit incorporating triangles produced following the teachings of U.S. Pat. No. 4,224,380. Norite granite is a very hard material having a uniaxial compressive strength of 277 MPa.

I claim:

1. An abrasive tool having a working portion which includes an abrasive insert held therein, said abrasive insert consisting essentially of a mass of diamond particles present in an amount of 80 to 90 percent by volume of the insert and a second phase present in an amount of 10 to 20 percent by volume of the insert, the mass of diamond particles containing substantial diamond-to-diamond bonding to form a coherent skeletal mass and the second phase consisting essentially of silicon or silicon carbide or a combination thereof, said abrasive insert being capable of withstanding a temperature of 1200° C. under a vacuum of $10^{-4}$ Torr or better or in an inert or reducing atmosphere without significant graphitization of the diamond occurring, and said insert having been exposed to a high temperature during manufacture of the tool, or being adapted for exposure to a high temperature during use of the tool.

2. An abrasive tool according to claim 1 wherein the insert is exposed to a temperature about 850° C. during manufacture or use of the tool.

3. An abrasive tool according to claim 1 which is a dressing tool comprising a shank and an abrasive insert mounted in one end thereof to present a dressing or turning edge for the tool.

4. An abrasive tool according to claim 1 which is a turning tool comprising a shank and an abrasive insert mounted in one end thereof to present a dressing or turning edge for the tool.

5. An abrasive tool according to claim 1 wherein the abrasive insert has a disc, triangular, cube, rectangular, hexagonal or irregular shape.

6. An abrasive tool of claim 1 which is a drill bit comprising a rotatable body having at one end thereof a cutting face, the cutting face including a plurality of abrasive inserts held in a bonding matrix and presenting cutting edges or points for the face.

7. An abrasive tool according to claim 6 which is a surface set drill bit.

8. An abrasive tool according to claim 6 which is an impregnated drill bit.

9. An abrasive tool according to claim 6 wherein the abrasive inserts are triangular in section, the bases of the triangles being embedded in the bonding matrix and the apices and side edges leading therefrom of the triangles presenting cutting edges.

10. An abrasive tool according to claim 6 wherein the abrasive inserts are of block form, the major portion of each being embedded in the bonding matrix and the cutting edge for each being provided by a projecting portion of pyramidal shape.

11. An abrasive tool according to claim 10 wherein the abrasive inserts are cubes.

12. An abrasive tool according to claim 1 which, when drilling Norite granite at a load of 1000 kg, has a penetration rate of at least about 12 cm/min after drilling 22 meters into the granite.

13. An abrasive tool having a working portion which includes an abrasive insert held therein, said insert consisting essentially of a mass of diamond particles present in an amount of 80 to 90 percent by volume of the insert and a second phase present in an amount of 10 to 20 percent by volume of the insert, the mass of diamond particles containing substantial diamond-to-diamond bonding to form a coherent skeletal mass and the second phase consisting essentially of silicon or silicon carbide or a combination thereof, said abrasive insert being capable of withstanding a temperature of 1200° C. under a vacuum of $10^{-4}$ Torr or better or in an inert or reducing atmosphere without significant graphitization of the diamond occurring, said abrasive insert having been exposed to a high temperature during manufacture of the tool or being adapted for exposure to a high temperature during use of the tool, and said abrasive insert having been formed by confining diamond and silicon within a reaction vessel comprising a high-melting, carbide-forming metal.

14. An abrasive tool according to claim 13, wherein the reaction vessel comprises molybdenum, tantalum or titanium.

15. An abrasive tool according to claim 13 wherein said diamond particles are of size less than 100 microns in size.

16. An abrasive tool according to claim 15 wherein said diamond particles are of size from 10 to 75 microns.

17. An abrasive tool according to claim 16 wherein said diamond particles are of size from 15 to 30 microns.

18. An abrasive tool according to claim 13 wherein said abrasive insert is formed by infiltrating silicon into the diamond-particle mass while the diamond and silicon are confined in said reaction vessel.

19. A method of cutting a material with an abrasive tool having a working portion including an abrasive insert held therein, which cutting operation results in the generation of temperature above 850° C. in the region of interface of the tool and the material being cut, said method comprising the step of contacting said material and the abrasive insert of the abrasive tool, said abrasive insert consisting essentially of a mass of diamond particles present in an amount of 80 to 90 percent by volume of the insert and a second phase present in an amount of 10 to 20 percent by volume of the insert, the mass of diamond particles containing substantial diamond-to-diamond bonding to form a coherent skeletal mass and the second phase consisting essentially of silicon or silicon carbide or a combination thereof and said abrasive insert of said tool being capable of withstanding a temperature of 1200° C. under a vacuum of $10^{-4}$ Torr or better or in an inert or reducing atmosphere without significant graphitization of the diamond occurring.

20. A method according to claim 19 wherein the material to be cut is rock.

21. A method according to claim 19 wherein the abrasive tool is a dressing or turning tool.

22. A method according to claim 19 wherein the abrasive tool is a drill bit.

23. A method according to claim 19 wherein the drill bit is an impregnated drill bit or a surface set drill bit.

24. A method according to claim 19 wherein the abrasive insert has a disk, triangular, cube, rectangular, hexagonal or irregular shape.

25. A method according to claim 19 wherein the abrasive tool is a drill bit comprising a rotatable body having at one end thereof a cutting face, the cutting face including a plurality of abrasive inserts held in a bonding matrix and presenting cutting edges or points for the face.

26. A method according to claim 19 wherein the abrasive inserts are triangular in section, the bases of the triangle being embedded in the bonding matrix and the apices and side edges leading therefrom of the triangles presenting cutting edges.

27. A method according to claim 19 wherein the abrasive inserts are of block form, the major portion of each being embedded in the bonding matrix and the cutting edge for each being provided by a projecting portion of a pyramidal shape.

28. A method according to claim 19 wherein the abrasive inserts are cubes.

29. A process for the production of an abrasive tool having a working portion including an abrasive insert held therein, which comprises the steps of:
confining a mass of diamond particles and a mass of silicon in contact with said mass of diamond particles in a reaction vessel;
subjecting the contents of said reaction vessel to conditions of temperature and pressure sufficient to cause substantial diamond-to-diamond bonding in the mass of diamond particles to form a coherent skeletal mass, and to cause the formation of a second phase containing said silicon and distributed throughout said coherent skeletal mass;
recovering the contents of said reaction vessel, and forming therefrom an abrasive insert, said abrasive insert consisting essentially of 80 to 90 percent by volume diamond and 10 to 20 percent of said second phase consisting essentially of silicon or silicon carbide or a combination thereof, and said abrasive insert being capable of withstanding a temperature of 1200° C. under a vacuum of $10^{-4}$ Torr or better or in an inert or reducing atmosphere without significant graphitization of the diamond occurring; and
incorporating the abrasive insert in an abrasive tool, during which incorporation the abrasive insert is exposed to a temperature above 850° C.

30. A process according to claim 29 wherein the reaction vessel comprises a high-melting, carbide-forming metal.

31. A process according to claim 30 wherein the high-melting, carbide-forming metal is molybdenum, tantalum or titanium.

32. A process according to claim 29 wherein the diamond particles are of size less than 100 microns.

33. A process according to claim 29 wherein the diamond particles are of size from 10 to 75 microns.

34. A process according to claim 29 wherein the diamond particles are of size from 15 to 30 microns.

* * * * *

UNITED STATES PATENT AND TRADEMARK OFFICE
CERTIFICATE OF CORRECTION

PATENT NO. : 4,793,828

DATED : December 27, 1988

INVENTOR(S) : Richard P. Burnand

It is certified that error appears in the above-identified patent and that said Letters Patent is hereby corrected as shown below:

Column 3, line 2, "850°" should read --850°C--.

Signed and Sealed this

Twenty-fifth Day of July, 1989

Attest:

DONALD J. QUIGG

Attesting Officer

Commissioner of Patents and Trademarks